United States Patent
Yamada et al.

(12)

(10) Patent No.: US 7,061,499 B2
(45) Date of Patent: Jun. 13, 2006

(54) IMAGE DRAWING APPARATUS

(75) Inventors: Atsushi Yamada, Kawasaki (JP); Hidefumi Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 542 days.

(21) Appl. No.: 10/262,673

(22) Filed: Oct. 2, 2002

(65) Prior Publication Data

US 2003/0095128 A1 May 22, 2003

(30) Foreign Application Priority Data

Nov. 21, 2001 (JP) .............................. 2001-356588

(51) Int. Cl.
*G09G 5/37* (2006.01)

(52) U.S. Cl. .................. 345/562; 345/561; 345/640

(58) Field of Classification Search ............. 345/562, 345/537, 640, 538, 532, 536, 573, 561
See application file for complete search history.

(56) References Cited

U.S. PATENT DOCUMENTS

| | | | | |
|---|---|---|---|---|
| 5,608,824 A | * | 3/1997 | Shimizu et al. | 382/276 |
| 5,812,143 A | * | 9/1998 | Lum et al. | 345/676 |
| 6,226,017 B1 | * | 5/2001 | Goossen et al. | 345/531 |
| 6,424,343 B1 | * | 7/2002 | Deering et al. | 345/419 |
| 6,445,386 B1 | * | 9/2002 | Cook et al. | 345/419 |

OTHER PUBLICATIONS

Bong, Duane. "Alpha Blending." http://www.visionengineer.com/comp/alpha_blending.shtml.*

Mammen, Abraham, et al., "Transparency and Antialiasing Algorithms Implemented with the Virtual Pixel Maps Technique", IEEE Computer Graphics and Applications, vol. 9, No. 4, Jul. 1, 1989, pp. 43–55.*

* cited by examiner

*Primary Examiner*—Kee M. Tung
*Assistant Examiner*—Joni Hsu
(74) *Attorney, Agent, or Firm*—Staas & Halsey LLP

(57) ABSTRACT

An image drawing apparatus includes a first data reading unit which stores a source image data into a first image data buffer. A second data reading unit reads a destination image data from a destination area of a memory device and stores the destination image data into a second image data buffer. A third data reading unit reads a transmission coefficient data from the memory device and stores the transmission coefficient data into a transmission coefficient data buffer. A transmission drawing processing control unit executes a transmission drawing processing for the source image data and the destination image data by using the transmission coefficient data to generate a processed image data. The transmission coefficient data has a block size that is the same as a block size of the source image data, and contains transmission coefficients that are varied with respect to every pixel of the source image data.

14 Claims, 5 Drawing Sheets

BITBLT TRANSFER W/O TRANSMISSION DRAWING PROCESSING

TRANSMISSION DRAWING PROCESSING WITH TRANSMISSION COEFFICIENT FIXED

TRANSMISSION DRAWING PROCESSING
WITH TRANSIMISSION COEFFICIENT VARIED

TRANSMISSION DRAWING PROCESSING
WITH TRANSMISSION COEFFICIENT VARIED

IMAGE DRAWING APPARATUS

BACKGROUND OF THE INVENTION

1. Field of the Invention

The present invention relates to an image drawing apparatus that can execute transmission drawing processing when performing a bit block transfer operation with respect to image data stored in an arbitrary rectangular area (or a block area) of a memory device.

2. Description of the Related Art

Conventionally, when performing a bit block transfer (hereinafter called BITBLT transfer) operation with respect to image data stored in an arbitrary block area of a memory device, the use of transmission drawing processing has hardly been considered. If the transmission drawing processing is executed when performing the BITBLT transfer operation, or the bit block copying of a rectangular-block image from the source to the destination, the source image becomes transparent. Even after the copying it is possible to distinguish the destination image which lies originally at the destination to some extent because of the transparency of the transferred image. Hence, the transmission drawing processing makes the renewal of image data at the destination easily discriminable.

There is a conventional image drawing apparatus that is able to execute the transmission drawing processing. However, in such conventional image drawing apparatus, even if the transmission drawing processing is performed, the transmission coefficient for every pixel of image data stored in a block area of a memory device serve as a fixed value. The BITBLT transfer operation is performed merely with such fixed transmission coefficients.

A description will be given of examples of the transmission drawing processing which is performed by a conventional image drawing apparatus with reference to FIG. 1A and FIG. 1B. For the sake of convenience of description, a change of the corresponding image on the screen of a display device after the BITBLT transfer operation is performed is shown in FIG. 1A and FIG. 1B.

FIG. 1A shows an example of the BITBLT transfer operation that is performed in order to bit-block copy the image from the source to the destination. In the example of FIG. 1A, the transmission drawing processing is not performed. FIG. 1B shows another example of the transmission drawing processing which is executed when the BITBLT transfer operation is performed with the transmission coefficient for every pixel of the image that is set to a fixed value. As in the example of FIG. 1B, the conventional image drawing apparatus executes the transmission drawing processing in which the BITBLT transfer operation is performed with the transmission coefficient for every pixel of the image stored in a block area of a memory device that is set to a fixed value. The effect of the transmission drawing processing by the conventional image drawing apparatus is limited as shown in FIG. 1B, and it is impossible to execute the transmission drawing processing in which the BITBLT transfer operation is performed while the transmission coefficient is arbitrarily varied for every pixel of the image.

Next, a description will be given of examples of the desired transmission drawing processing in which the BITBLT transfer operation is performed while the transmission coefficient is arbitrarily varied for every pixel of the image, with reference to FIG. 2A and FIG. 2B. For the sake of convenience of description, a change of the corresponding image on the screen of a display device after the BITBLT transfer operation is performed is shown in FIG. 2A and FIG. 2B.

FIG. 2A shows an example of the desired transmission drawing processing. In the example of FIG. 2A, when the BITBLT transfer operation is performed in order to copy a rectangular-block image from the source to the destination, the transmission coefficient is decreased in a diagonal direction from the lower left corner of the block (the image) to the center and increased in a diagonal direction from the center to the upper right corner of the block.

FIG. 2B shows another example of the desired transmission drawing processing. In the example of FIG. 2B, when the BITBLT transfer operation is performed in order to copy a rectangular-block image from the source to the destination, the transmission coefficient is increased in radial directions from the center of the block (the image) to the circumferential portions of the block.

Generally, a very long processing time is required when the BITBLT transfer operation is performed while the transmission coefficient is varied for every pixel of the image stored in a block area (or a rectangular region) of a memory device, regardless of whether the changing ratio of the transmission coefficient is linear or nonlinear. Moreover, if the function to perform the BITBLT transfer operation while the transmission coefficient is varied is added, the scale of the conventional image drawing apparatus will be large.

The conventional image drawing apparatus originally does not have means to execute the desired transmission drawing processing as shown in FIG. 2A or FIG. 2B. In order to enable the conventional image drawing apparatus to perform this function, it is necessary that the complicated task to perform the BITBLT transfer operation with the transmission coefficient being varied for every pixel of the image stored in a block area of a memory device be imposed on a CPU of the conventional image drawing apparatus. In such a case, complicated transmission drawing processing must be executed by the CPU, and there is a tendency that the processing time will become very long.

SUMMARY OF THE INVENTION

An object of the present invention is to provide an improved image drawing apparatus in which the above-described problems are eliminated.

Another object of the present invention is to provide an image drawing apparatus which can speedily execute, with a simple configuration, the transmission drawing processing in which the BITBLT transfer operation is performed while the transmission coefficients are varied for every pixel of image data stored in a block area of a memory device.

The above-mentioned objects of the present invention are achieved by an image drawing apparatus which performs a bit block transfer operation for image data stored in an arbitrary block area of a memory device, comprising: a first data reading unit which stores a source image data into a first image data buffer; a second data reading unit which reads a destination image data from a destination area of the memory device and storing the destination image data into a second image data buffer; a third data reading unit which reads a transmission coefficient data from the memory device and storing the transmission coefficient data into a transmission coefficient data buffer; and a transmission drawing processing control unit which executes a transmission drawing processing for the source image data of the first image data buffer and the destination image data of the second image data buffer by using the transmission coefficient data of the transmission coefficient data buffer to generate a processed image data, wherein the transmission coefficient data which the third data reading unit reads from the memory device has a block size that is the same as a block size of the source image data, and contains transmission coefficients that are varied with respect to every pixel of the source image data.

According to the image drawing apparatus of the present invention, the transmission drawing processing can be easily executed at the time of performing the BITBLT transfer operation by using the transmission coefficients that are varied for every pixel of the image data. The transmission coefficient data used for the transmission drawing processing can be arbitrarily determined for every pixel of the image data. It is possible to store predetermined transmission coefficient data in the memory device. The third data reading unit can speedily read out the transmission coefficient data, and the image drawing apparatus can shorten the processing time needed to carry out the transmission drawing processing.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 1A:
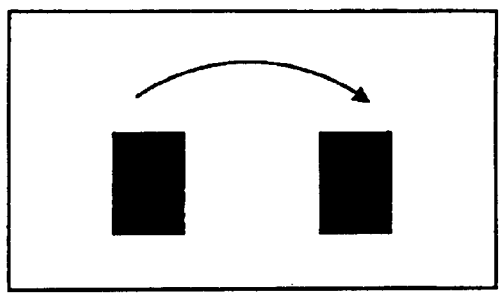
FIG. 1A and FIG. 1B are diagrams for explaining the transmission drawing processing that is performed by a conventional image drawing apparatus at the time of BIT-BLT transfer.
Figure 1B:
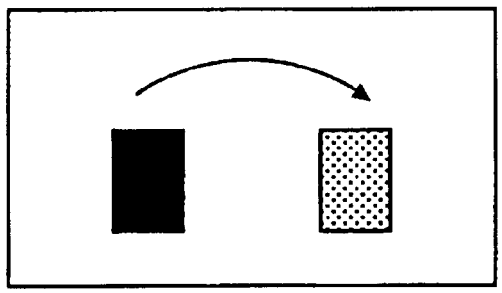
Figure 2A:
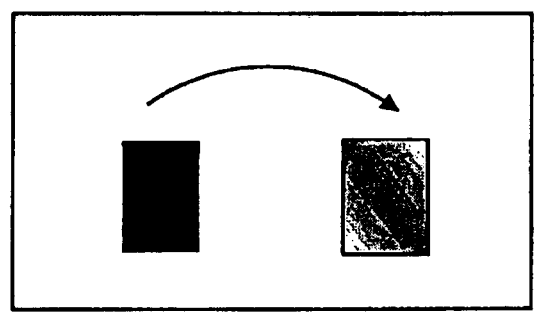
FIG. 2A and FIG. 2B are diagrams for explaining transmission drawing processing is performed, changing transmission coefficient at the time of BITBLT transfer.
Figure 2B:
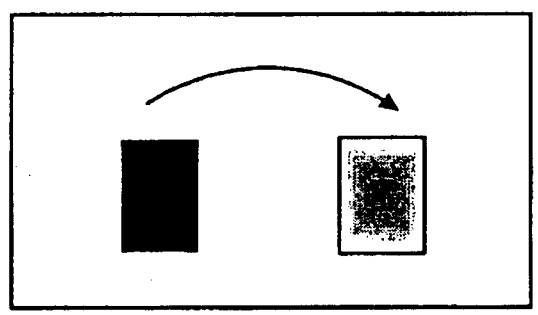
Figure 3:
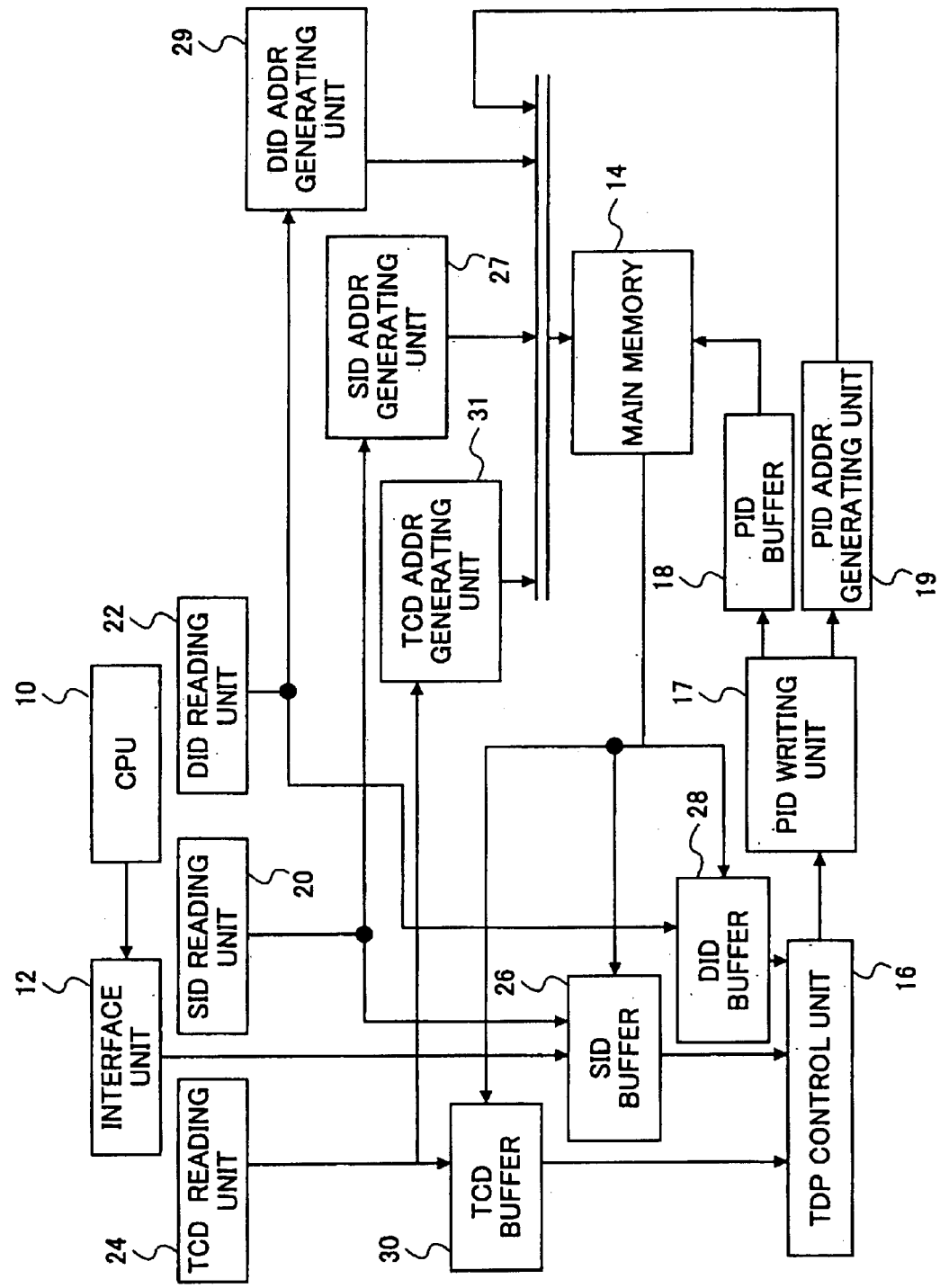
FIG. 3 is a block diagram of one preferred embodiment of the image drawing apparatus according to the present invention.

FIG. 3 shows one preferred embodiment of the image drawing apparatus according to the present invention.

In the image drawing apparatus in FIG. 3, a main memory unit 14 (called also a memory device 14) is provided to store image data that is redrawn on the screen of a display device (not shown). However, the present invention is not limited to the image drawing apparatus having the main memory unit 14 which stores the image data, but it is also applicable to an image drawing apparatus having another type of memory device which stores the image data.

In order to overcome the problem of the above-described conventional method, the image drawing apparatus of the present embodiment is provided with the memory device 14 that stores image data in an arbitrary block area (a rectangular portion) of the memory device 14 and related to the BITBLT transfer operation, and stores predetermined transmission coefficient data that are related to the transmission drawing processing and contain transmission coefficients varied for every pixel of the source image data. The transmission coefficient data has a block size that is the same as a block size of the source image data, and can be read out by the image drawing apparatus of the present embodiment easily and speedily. Hence, the image drawing apparatus of the present embodiment can shorten the processing time needed to carry out the transmission drawing processing.

In the image drawing apparatus shown in FIG. 3, a source image data (SID) reading unit 20 is provided to read out a source image data. If an arbitrary block area of the memory device 14 is specified as including the source image data, the SID reading unit 20 reads the source image data from the block area of the memory device 14 and stores it into a source image data (SID) buffer 26.

A source image data (SID) address generating unit 27 receives, in accordance with a data reading request from the SID reading unit 20, a position information indicating a starting point of the specified block area of the memory device 14 and a length information indicating both a lateral length and a longitudinal length of the specified block area of the memory device 14, and computes an address of the specified block area of the memory device 14 where the source image data is to be read. The SID address generating unit 27 sends out a corresponding read address signal to the memory device 14 when the SID reading unit 20 reads the source image data from the memory device 14.

When the source image data is read out, a transmission coefficient data (TCD) reading unit 24 reads a transmission coefficient data from the memory device 14. The transmission coefficient data which the TCD reading unit 24 reads from the memory device 14 has a block size that is the same as a block size of the source image data, and contains predetermined transmission coefficients which are varied for every pixel of the source image data. The TCD reading unit 24 stores the transmission coefficient data in a transmission coefficient data (TCD) buffer 30.

A transmission coefficient data (TCD) address generating unit 31 receives, in accordance with a data reading request from the TCD reading unit 24, a position information indicating a starting point of a specified block area of the memory device 14 and a length information indicating both a lateral length and a longitudinal length of the specified block area of the memory device 14, and computes an address of the specified block area of the memory device 14 where the transmission coefficient data is to be read. The TCD address generating unit 31 sends out a corresponding read address signal to the memory device 14 when the TCD reading unit 24 reads the transmission coefficient data from the memory device 14.

When a destination area of the memory device 14 (having a block size that is the same as a block size of the source image data) where the destination image data is stored is specified, a destination image data (DID) reading unit 22 reads the destination image data from the destination area of the memory device 14, and stores it into a destination image data (DID) buffer 28.

A destination image data (DID) address generating unit 29 receives, in accordance with a data reading request from the DID reading unit 22, a position information indicating a starting point of the destination area of the memory device 14 and a length information indicating both a lateral length and a longitudinal length of the destination area of the memory device 14 and computes an address of the destination area of the memory device 14 where the destination image data is to be read. The DID address generating unit 29 sends out a corresponding read address signal to the memory device 14 when the DID reading unit 22 reads the destination image data from the memory device 14.

In the image drawing apparatus in FIG. 3, a transmission drawing processing (TDP) control unit 16 is provided to execute transmission drawing processing (or blending processing). The TCD control unit 16 receives the source image data from the SID buffer 26, the destination image data from the DID buffer 28, and the transmission coefficient data from the TCD data buffer 30 almost simultaneously. The TDP control unit 16 performs the transmission drawing processing for the received source image data and the received destination image data by using the received transmission coefficient data, and generates a processed image data as a result of the execution of the transmission drawing processing. A description of the transmission drawing processing (blending processing) which is executed by the TDP control unit 16 will be given later with reference to FIG. 4.

In the image drawing apparatus in FIG. 3, a processed image data (PID) writing unit 17 receives the processed image data which is generated by the TDP control unit 16, and temporarily stores the received processed image data into a processed image data (PID) buffer 18. When the processed image data is stored in the PID buffer 18, the TDP control unit 16 sends out a data writing request to the memory device 14 through the PID writing unit 17. In accordance with the data writing request, the PID writing unit 17 performs writing of the processed image data from the PID buffer 18 to the destination area of the memory device 14.

A processed image data (PID) address generating unit 19 receives, in accordance with the data writing request from the PID writing unit 17, a position information indicating a starting point of the destination area of the memory device 14 and a length information indicating both a lateral length and a longitudinal length of the destination area of the memory device 14, and computes an address of the destination area of the memory device 14 where the processed image data is to be written. The PID address generating unit 19 sends out a corresponding write address signal to the memory device 14 when the PID writing unit 17 writes the processed image data from the PID buffer 18 to the memory device 14.

As described above, the image drawing apparatus of the present embodiment can execute the transmission drawing processing in which the BITBLT transfer operation is performed with respect to the destination area of the memory device 14 by using the transmission coefficient data which contains the transmission coefficients varied for every pixel of the source image data in the memory device 14.

In the image drawing apparatus of the present embodiment, the memory device 14 is provided such that it stores the predetermined transmission coefficient data containing the transmission coefficients varied for every pixel of the source image data and having a block size that is the same as a block size of the source image data related to the BITBLT transfer operation. When reading the source image data from the memory device 14, the transmission coefficient data is also read from the memory device 14 simultaneously. Furthermore, the destination image data is read from the memory device. The TDP control unit 16 executes the transmission drawing processing (the blending processing) for the source image data and the destination image data by using the transmission coefficient data to generate the processed image data (or a new transmission drawing data being generated). The processed image data as a result of the execution of the transmission drawing processing is written to the destination area of the memory device 14 so that the new transmission drawing data is redrawn on the screen of the display device. The transmission coefficient data is arbitrarily predetermined for every pixel of the source image data stored in a specified block area of the memory device 14, and a linear changing ratio or a non-linear changing ratio of the transmission coefficients in the block area of the memory device 14 can be set without restriction especially.

Therefore, it is possible for the image drawing apparatus of the present embodiment to realize, with a simple configuration, the transmission drawing processing in which the BITBLT transfer operation is performed by using the transmission coefficient data containing the transmission coefficients varied for every pixel of the source image data stored in a block area of the memory device, and it is possible to shorten the processing time needed to carry out the transmission drawing operation.

In the above-described embodiment, the source image data reading unit 20 reads the source image data from the memory device 14 and stores it into the SID buffer 26. However, the present invention is not limited to the above-described embodiment. Alternatively, the image drawing apparatus of FIG. 3 may be configured so that it receives the source image data, which is transmitted from an external CPU 10 (an external control device) to the SID buffer 26 through an interface 12, and stores the source image data into the SID buffer 26. In such alternative embodiment, the source image data that is sent from the external CPU 10 may be a bi-level image data, and the bi-level image data may be stored into the SID buffer 26. Moreover, it is readily understood that, in such alternative embodiment, the source image data stored in the SID buffer 26 may be not only a bi-level image data but also a multiple-level image data or a color image data.

Furthermore, the image drawing apparatus of FIG. 3 may be configured so that the TDP control unit 16 is provided with a conversion unit that converts a bi-level image data into a multiple-level image data. In such alternative embodiment, when the external CPU 10 transmits a bi-level image data to the SID buffer 26 through the interface 12, the conversion unit of the TDP control unit 16 receives the bi-level image data from the SID buffer 26 and converts the bi-level image data into a multiple-level image data. In this case, the TDP control unit 16 executes the transmission drawing processing by using the multiple-level image data, produced by the conversion unit, as the source image data.

Figure 4:
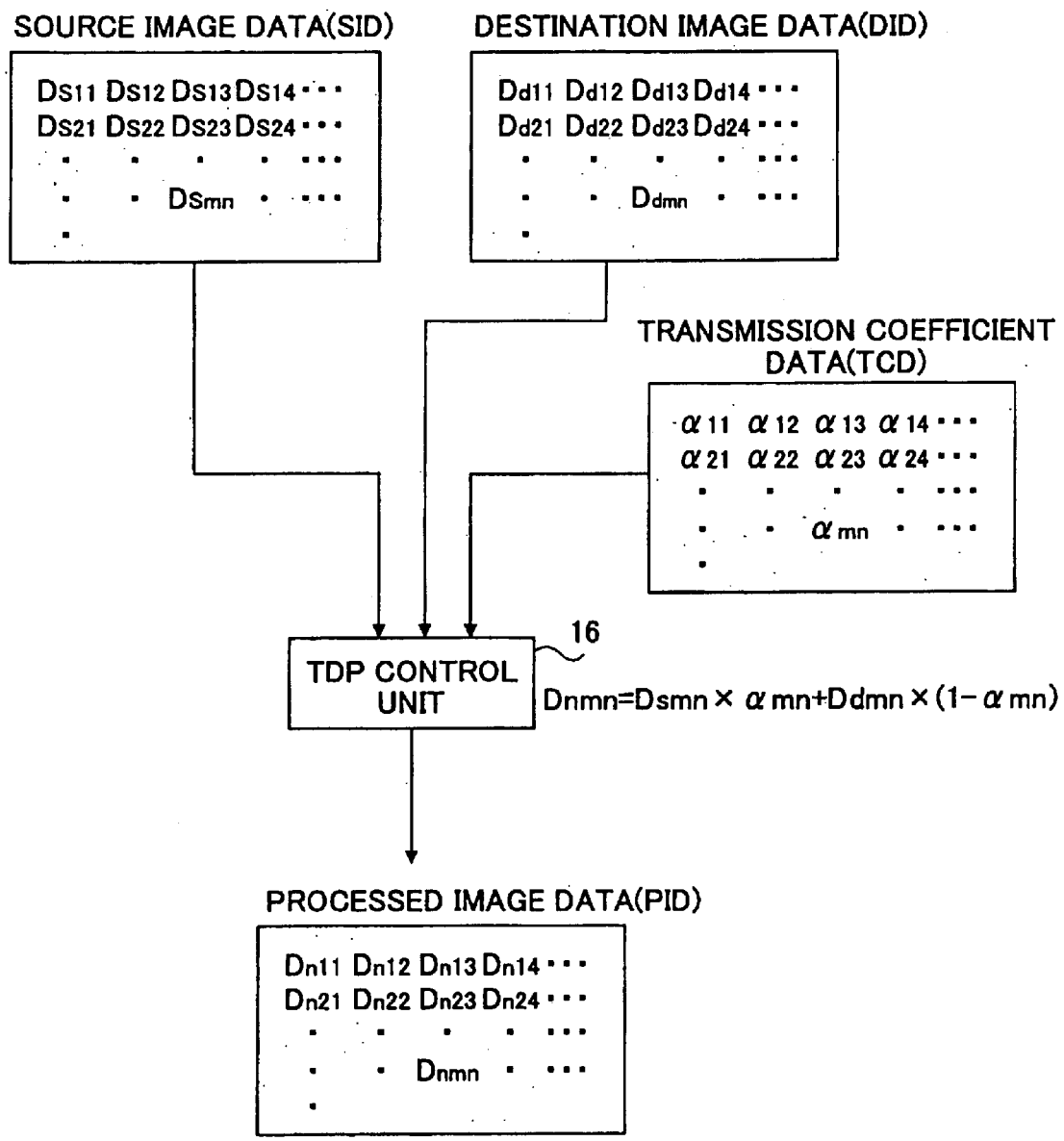
FIG. 4 is a diagram for explaining the transmission drawing processing which is executed by the image drawing apparatus of the embodiment in FIG. 3.

Next, FIG. 4 shows an example of the transmission drawing processing which is executed by the TDP control unit 16 in the image drawing apparatus of the embodiment shown in FIG. 3.

As described above, in the image drawing apparatus in FIG. 3, the transmission drawing processing (TDP) control unit 16 receives the source image data from the SID buffer 26, the transmission coefficient data from the TCD buffer 30, and the destination image data from the DID buffer 28 almost simultaneously.

Here, as shown in FIG. 4, it is assumed that $D_s$ indicates the source image data, $D_d$ indicates the destination image data, $\alpha$ indicates the transmission coefficient data ($0<\alpha<1$), and $D_n$ indicates the processed image data. The TDP control unit 16 of the present embodiment executes the transmission drawing processing in accordance with the operation formula: $D_n = D_s \times \alpha + D_d \times (1-\alpha)$.

For the sake of simplicity of description, in the example of FIG. 4, it is assumed that the source image data sent from the source image data buffer 26 to the transmission drawing processing control unit 16 is expressed by a two-dimensional source image data sequence $Ds_{mn}$ which has a block size (m×n), as given below.

| $Ds_{11}$ | $Ds_{12}$ | $Ds_{13}$ | $Ds_{14}$ | ... |
|---|---|---|---|---|
| $Ds_{21}$ | $Ds_{22}$ | $Ds_{23}$ | $Ds_{24}$ | ... |
| — | — | — | — | ... |
| — | — | — | — | $Ds_{mn}$ | where $Ds_{11}$, $Ds_{12}$, and so on, indicate the respective pixel values of the source image data stored in a specified block area of the memory device 14.

At this time, the destination image data sent from the destination image data buffer 28 to the transmission drawing processing control unit 16 is expressed by a two-dimensional destination image data sequence $Dd_{mn}$ which has a block size that is the same as the block size of the source image data sequence $Ds_{mn}$, as given below.

| $Dd_{11}$ | $Dd_{12}$ | $Dd_{13}$ | $Dd_{14}$ | ... |
|---|---|---|---|---|
| $Dd_{21}$ | $Dd_{22}$ | $Dd_{23}$ | $Dd_{24}$ | ... |
| — | — | — | — | ... |
| — | — | — | — | $Dd_{mn}$ | where $Dd_{11}$, $Dd_{12}$, and so on, indicate the respective pixel values of the destination image data stored in a destination block area of the memory device 14.

Moreover, the transmission coefficient data sent from the transmission coefficient data buffer 30 to the transmission drawing processing control unit 16 is expressed by a two-dimensional transmission coefficient data sequence $\alpha_{mn}$ which has a block size that is the same as the block size of the source image data sequence $Ds_{mn}$, as given below.

| $\alpha_{11}$ | $\alpha_{12}$ | $\alpha_{13}$ | $\alpha_{14}$ | ... |
|---|---|---|---|---|
| $\alpha_{21}$ | $\alpha_{22}$ | $\alpha_{23}$ | $\alpha_{24}$ | ... |
| — | — | — | — | ... |
| — | — | — | — | $\alpha_{mn}$ | where $\alpha_{11}$, $\alpha_{12}$, and so on, indicate the respective values of the transmission coefficients corresponding to the respective pixels of the source image data. In the image drawing apparatus of the present embodiment, the image transmission coefficient data sequence $\alpha_{mn}$ is stored, in advance, in the memory device 14 as the transmission coefficient data which contains the predetermined transmission coefficients varied for every pixel of the source image data stored in the block area of the memory device related to the BITBLT transfer operation. As described previously, each transmission coefficient value of the image transmission coefficient data sequence $\alpha_{mn}$ is arbitrarily predetermined for every pixel of the source image data stored in a specified block area of the memory device 14, and a linear changing ratio or a non-linear changing ratio of the transmission coefficients in the block area of the memory device 14 can be set without restriction especially.

The TDP control unit 16 of the embodiment in FIG. 3 generates a processed image data sequence Dn by executing the transmission drawing processing (the blend processing) in accordance with on the operation formula: $Dn=Ds\times\alpha+Dd\times(1-\alpha)$.

As shown in FIG. 4, the processed image data (PID) generated by the TDP control unit 16 is expressed by a two-dimensional processed image data sequence $Dn_{mn}$ which has a block size that is the same as the block size of the source image data sequence $Ds_{mn}$, as given below.

| $Dn_{11}$ | $Dn_{12}$ | $Dn_{13}$ | $Dn_{14}$ | ... |
|---|---|---|---|---|
| $Dn_{21}$ | $Dn_{22}$ | $Dn_{23}$ | $Dn_{24}$ | ... |
| — | — | — | — | ... |
| — | — | — | — | $Dn_{mn}$ |

The PID writing unit 17 of the embodiment in FIG. 3 receives the processed image data sequence $Dn_{mn}$, and writes the same to the destination area of the memory device 14 as a transmission drawing result. Namely, the BITBLT transfer operation is performed while the transmission coefficients related to the processed image data sequence $Dn_{mn}$ are varied for the respective pixels of the image data stored in the specified block area of the memory device 14.

Figure 5:
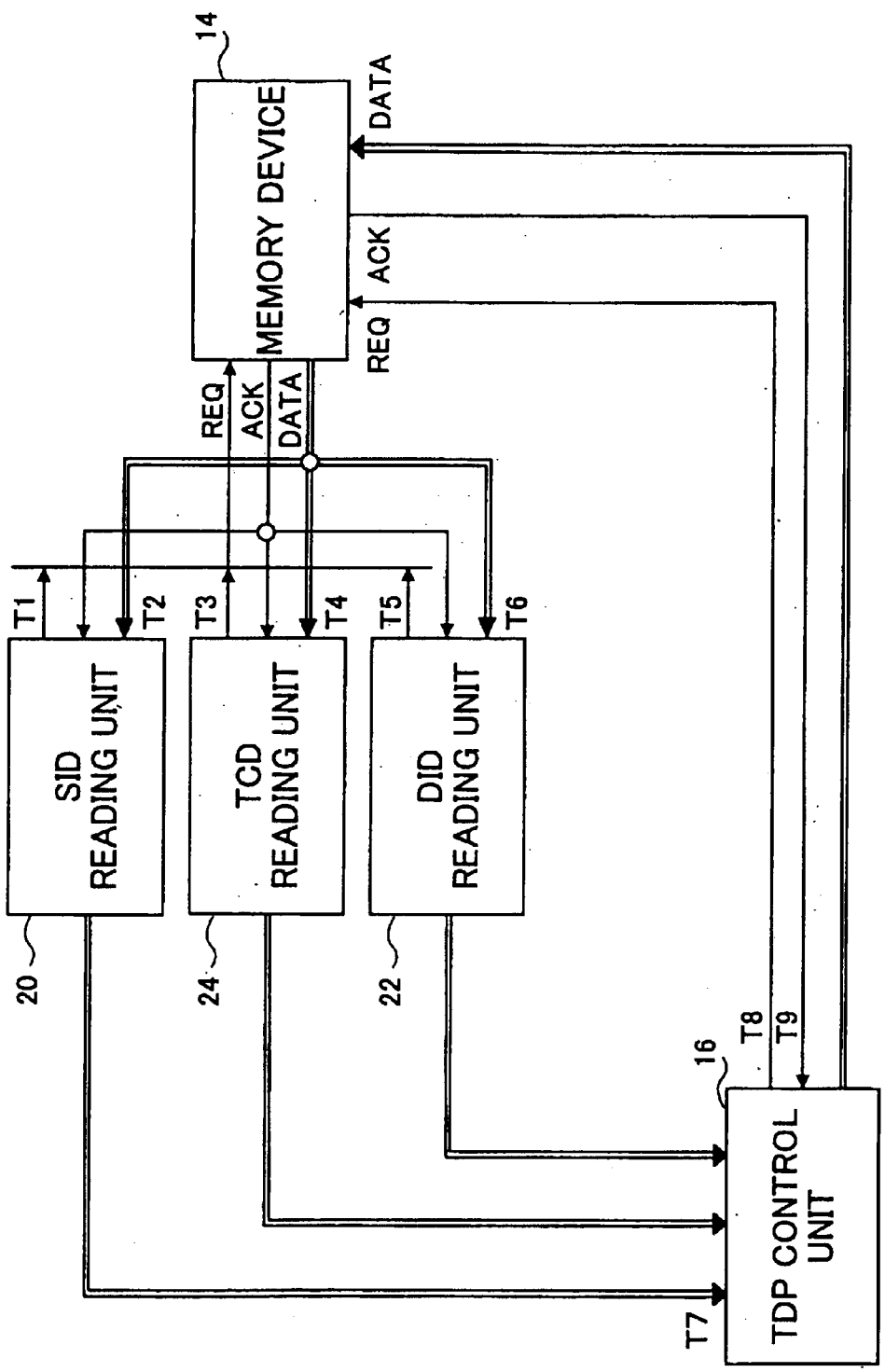
FIG. 5 is a diagram for explaining the flow of control signals and image data when the image drawing apparatus of the embodiment in FIG. 3 executes the transmission drawing processing.

FIG. 5 shows the flow of control signals and image data when the image drawing apparatus of the embodiment in FIG. 3 executes the transmission drawing processing.

In FIG. 5, the arrow of the solid line indicates the flow of a control signal, the arrow of the double line indicates the flow of image data, and T1, T2, and so on, indicate respective control procedures performed by the elements of the image drawing apparatus of the present embodiment.

As shown in FIG. 5, when the image drawing apparatus of the present embodiment starts the execution of the transmission drawing processing, the source image data (SID) reading unit 20 sends out a data reading request (REQ) signal to the memory device 14 (T1). In response to this control signal (REQ), the memory device 14 returns a data acknowledge (ACK) signal and image data (DATA) to the SID reading unit 20 (T2). In these control procedures T1 and T2, the SID reading unit 20 reads the source image data from the memory device 14 and stores the same into the source image data buffer 26 (not shown in FIG. 5).

Next, the transmission coefficient data (TCD) reading unit 24 sends out a data reading request (REQ) signal to the memory device 14 (T3). In response to this control signal (REQ), the memory device 14 returns a data acknowledge (ACK) signal and transmission coefficient data (DATA) to the TCD reading unit 24 (T4). In these control procedures T3 and T4, the TCD reading unit 24 reads the transmission coefficient data from the memory device 14 and stores the same into the transmission coefficient data buffer 30 (not shown in FIG. 5).

Furthermore, the destination image data (DID) reading unit 22 sends out a data reading request (REQ) signal to the memory device 14 (T5). In response to this control signal (REQ), the memory device 14 returns a data acknowledge (ACK) signal and image data (DATA) to the DID reading unit 22 (T6). In these control procedures T5 and T6, the DID reading unit 22 reads the destination image data from the memory device 14 and stores the same into the destination image data buffer 28 (not shown in FIG. 5).

After the reading of each data from the memory device 14 is completed, the transmission drawing processing (TDP) control unit 16 respectively receives the source image data, the transmission coefficient data, and the destination image data from the data buffer 26, the data buffer 30, and the data buffer 28 almost simultaneously (T7). After the control procedure T7 is performed, the TDP control unit 16 performs the transmission drawing processing (the blending processing) as shown in FIG. 4, and generates the processed image data.

After the transmission drawing processing is performed, the TDP control unit 16 transmits a data writing request (REQ) signal and the processed image data (DATA) to the memory device 14 through the processed image data writing unit 17 (not shown in FIG. 5) (T8). In response to this control signal (REQ), the processed image data writing unit 17 starts the writing of the processed image data to the destination area of the memory device 14. The memory device 14 returns a data acknowledge (ACK) signal to the TDP control unit 16 through the processed image data writing unit 17 (T9).

When the TDP control unit 16 receives this control signal (ACK), it is detected that the writing of the processed image data to the memory device 14 is completed. On the other hand, when the control signal (ACK) from the memory device 14 is not received at the TDP control unit 16, it is detected whether the transmission drawing processing for all the pixels of the processed image data is completed. When the processing is not completed, the control is returned to the above procedure T1. When the transmission drawing processing for all the pixels of the image data is completed, the transmission drawing processing is terminated by the image drawing apparatus of the present embodiment.

The present invention is not limited to the above-described embodiments, and variations and modifications may be made without departing from the scope of the present invention.

Further, the present invention is based on Japanese priority application No. 2001-356588, filed on Nov. 21, 2001, the entire contents of which are hereby incorporated by reference.

What is claimed is:

1. An image drawing apparatus which performs a bit block transfer operation for image data stored in an arbitrary block area of a first memory, comprising:

a first data reading unit storing a source image data into a first image data buffer;

a second data reading unit reading a destination image data from a destination area of the first memory and storing the destination image data into a second image data buffer;

a third data reading unit reading a transmission coefficient data from a second memory and storing the transmission coefficient data into a transmission coefficient data buffer; and a transmission drawing processing control unit executing a transmission drawing processing for the source image data of the first image data buffer and the destination image data of the second image data buffer by using the transmission coefficient data of the transmission coefficient data buffer to generate a processed image data, wherein the transmission coefficient data, which the third data reading unit reads from the second memory, has a block size that is the same as a block size of the source image data, and contains transmission coefficients that are varied with respect to every pixel of the source image data.

2. The image drawing apparatus of claim 1, wherein the source image data is transmitted from an external control device to the image drawing apparatus through an interface and stored in the first image data buffer by the first data reading unit.

3. The image drawing apparatus of claim 1, wherein the transmission drawing processing control unit is provided with a conversion unit that receives a bi-level image data sent from an external control device through the first image data buffer and converts the bi-level image data into a multiple-level image data, and the transmission drawing processing control unit executes the transmission drawing processing by using the multiple-level image data, produced by the conversion unit, as the source image data.

4. The image drawing apparatus of claim 1, wherein the source image data stored in the first image data buffer is a bi-level image data.

5. The image drawing apparatus of claim 1, further comprising a processed image data writing unit which receives the processed image data, generated by the transmission drawing processing control unit, and writes the processed image data to the destination area of the first memory in accordance with a data writing request from the transmission drawing processing control unit.

6. The image drawing apparatus of claim 5, wherein the processed image data writing unit is provided with a processed image data, buffer which temporarily stores the processed image data, generated by the transmission drawing processing control unit, so that the processed image data writing unit writes the stored image data to the destination area of the first memory.

7. The image drawing apparatus of claim 5, further comprising an address generating unit which receives, in accordance with a data writing request from the processed image data writing unit, a position information indicating a starting point of the destination area of the first memory and a length information indicating both a lateral length and a longitudinal length of the destination area of the first memory, the address generating unit computing an address of the destination area of the first memory where the processed image data is to be written.

8. The image drawing apparatus of claim 1, wherein the transmission drawing processing control unit executes the transmission drawing processing in accordance with operation formula: $Dn=Ds \times \alpha + Dd \times (1-\alpha)$, where Ds indicates the source image data, Dd indicates the destination image data, $\alpha$ indicates the transmission coefficient data ($0<\alpha<1$), and Dn indicates the processed image data.

9. The image drawing apparatus of claim 1, wherein the first data reading unit reads the source image data from a source area of a third memory and stores the source image data into the first image data buffer.

10. The image drawing apparatus of claim 9, further comprising an address generating unit which receives, in accordance with a data reading request from the first data reading unit, a position information indicating a starting point of a specified block area of the third memory and a length information indicating both a lateral length and a longitudinal length of the specified block area of the third memory, the address generating unit computing an address of the specified block area of the third memory where the source image data is to be read.

11. The image drawing apparatus of claim 9, wherein the first memory, and the second memory, and the third memory are constituted by a memory device.

12. The image drawing apparatus of claim 1, further comprising an address generating unit which receives, in accordance with a data reading request from the third data reading unit, a position information indicating a starting point of a specified block area of the second memory and a length information indicating both a lateral length and a longitudinal length of the specified block area of the second memory, the address generating unit computing an address of the specified block area of the second memory where the transmission coefficient data is to be read.

13. The image drawing apparatus of claim 1, further comprising an address generating unit which receives, in accordance with a data reading request from the second data reading unit, a position information indicating a starting point of the destination area of the first memory and a length information indicating both a lateral length and a longitudinal length of the destination area of the first memory, the address generating unit computing an address of the destination area of the first memory where the destination image data is to be read.

14. The image drawing apparatus of claim 1, wherein the first memory and the second memory are constituted by a memory device.

* * * * *

UNITED STATES PATENT AND TRADEMARK OFFICE
CERTIFICATE OF CORRECTION

PATENT NO. : 7,061,499 B2  
APPLICATION NO. : 10/262673  
DATED : June 13, 2006  
INVENTOR(S) : Atsushi Yamada et al.

It is certified that error appears in the above-identified patent and that said Letters Patent is hereby corrected as shown below:

First Page Column 2 Item [56] (Other Publications), Line 1, after "Duane" change "." to --,--.

Column 9, Line 46, after "reading" delete "a".

Column 9, Line 59, change "data," and insert --data--.

Signed and Sealed this

Ninth Day of January, 2007

JON W. DUDAS  
*Director of the United States Patent and Trademark Office*